3,388,532
PROCESS FOR THE PRETREATMENT OF GASES
Taiseki Kunugi and Takaaki Tamura, Tokyo, Japan, assignors to Kogyokaihatsu Kenkyujo, Tokyo, Japan, a body corporate of Japan
No Drawing. Filed Dec. 21, 1965, Ser. No. 515,478
Claims priority, application Japan, Dec. 25, 1964, 39/73,284
2 Claims. (Cl. 55—76)

This invention relates to improvements in a process for the pretreatment of gases.

A process for the continuous separation of a desired gas component or desired gas components by adsorption from a gaseous mixture containing the same, utilizing fluidized and moving beds is known. The industrial practice of such a process is greatly prejudiced after the adsorbent becomes "poisoned" or inactivated, for example by the adsorption of undesired components, so that a large quantity of the adsorbent has to be regenerated.

For example when a process such as that above described is applied to the recovery of ethylene from coke oven gas (with, for example, an ethylene concentration of about 3.5% by volume) using woody active carbon, undesired components in the coke oven gas, such as (a) saturated and unsaturated hydrocarbons having more than 3 carbon atoms in the molecule and, (b) sulfides, are adsorbed on the active carbon, in addition to the desired ethylene. Moreover, these undesired components accumulate on the active carbon because they are not desorbed under the conditions employed for desorbing the ethylene from the woody active carbon. Accordingly, a large quantity of active carbon has to be regenerated within a short period of time, and also a large quantity of fresh active carbon has to be supplied, and this is a great hindrance to the realization of the separation process on an industrially feasible scale.

The present invention is directed to the goal of obviating the above-described difficulties in the separation process.

According to the present invention, this goal is achieved simply and at low cost by the expedient of using cheap, coaly active carbon as a preliminary adsorbent which adsorbs only the aforesaid undesired components which cause the deterioration of the adsorbent in the separation process proper. The said coaly active carbon does not adsorb the desired components of the crude gas mixture, e.g. coke oven gas, being treated. This gas mixture is passed through a layer of the said coaly active carbon to remove the aforesaid undesired components, before passing such gas mixture into the continuous gas separation system proper.

By the expression "woody" active carbon is meant active carbon derived from wood as starting material; by "coaly" active carbon is meant that derived from coal as starting material.

The coaly active carbon used in the pretreatment of gases according to the present invention is suitably prepared by subjecting a coal such as anthracite, brown coal, or lignite to a per se conventional activation treatment, for example a steam activation treatment. Such an active coaly carbon has a lower adsorption power than woody active carbon, so that the former can adsorb from the crude gaseous mixture only those components which in the present instance are "undesired." Further, since such a coaly active carbon is inexpensive, it can profitably be used as fuel, when it becomes inactivated, instead of regenerating it for reuse.

The pretreating process of this invention can be carried out in a solid bed system, a moving bed system, or a fluidized bed system; that is, it is carried out in an appropriate system in consideration of the properties of the raw gas being treated.

The present invention can therefore be succinctly defined as an improvement in a process for separating and recovering desired components from a crude gaseous mixture containing the same by a continuous gas adsorption method, said improvement comprising essentially the step of preliminary passing the crude gaseous mixture through a layer of coaly active carbon before supplying the crude mixture to the gas adsorption system proper, whereby undesired components, liable to cause deterioration of adsorbent used in the gas adsorption system proper, are effectively removed from the crude gas mixture.

The advantages of the process of the present invention are as follows:

(1) The deterioration of a comparatively expensive adsorbent in the continuous gas separation process can be completely prevented.

(2) Accordingly, the loss of the adsorbent in the gas separation process is at most only a very slight abrasion loss.

(3) Since an inexpensive coaly active carbon is used in the pretreatment of this invention, it is sufficiently profitable eventually to use the active carbon used in the pretreatment as fuel.

(4) By applying the pretreatment process of this invention, desired effective components can be recovered from a raw gas at low cost.

Following is a typical example of a presently-preferred embodiment of this invention:

A coke oven gas was passed alternately through two pretreating columns of 1.5 meters in diameter and 5 meters in height filled with 10 mesh anthracitic active carbon at room temperature of (20° to 30° C.) and at a flow rate of 1100 Nm.$^3$/hr. and then the thus pretreated coke oven gas was introduced into the adsorption section of a per se conventional multi-step fluidized bed type continuous adsorption apparatus, 650 mm.: in diameter, (cf., e.g., U.S. Pat. No. 3,177,631) from the bottom of the adsorption section while periodically supplying woody active carbon into the adsorption apparatus from the uppermost section thereof at a rate of 6 tons/hr. The woody active carbon carrying desired components of the gas was then continuously sent to a heating section wherein the adsorbed desired components were desorbed from the active carbon by heating them to 150° C. while concurrently blowing steam at a rate of 150 kg./hr. The active carbon was then cooled to 30° C. and returned again into the above-mentioned multi-step fluidized bed type adsorption section.

After conducting continuously the above procedure for 240 hours, the recovery ratio of ethylene was above 90% and the amount of freshly supplied woody active carbon was about 0.6 kg./hr., i.e. only a mechanical loss or abrasion loss whereas in the case of conducting the same fluidized bed type adsorption process without subjecting the raw gas to the pretreatment of this invention, the recovery ratio was about 50% after 24 hours (99.0% at start) and was reduced to 20% after 48 hours. The reduction of the recovery ratio was caused by the reduction of the adsorption power of the active carbon to ethylene, and in order to maintain the recovery ratio at an average of 50%, about 100 kg./hr. of fresh woody active carbon had to be supplied all the time. From the comparison tests, it is clear that the profit from the saving of supplied fresh active carbon obtained by utilizing the pretreatment of this invention exceeds the cost of the pretreatment.

What is claimed is:

1. In a process for recovering desired components from a raw gas mixture containing the said components by a continuous adsorption method, the improvement wherein the raw gas mixture is passed through a layer of coaly active carbon thereby removing undesired components which cause deterioration of adsorbent in the continuous adsorption system proper, and subsequently contacting said gas with woody active carbon in the continuous adsorption system.

2. The process according to claim 1 wherein the raw gas mixture is coke oven gas and the component to be recovered is ethylene.

References Cited
UNITED STATES PATENTS

| | | | |
|---|---|---|---|
| 2,354,383 | 7/1944 | Kiesskalt | 55—74 |
| 2,614,657 | 10/1952 | Nicholson et al. | 55—74 X |
| 2,721,184 | 10/1955 | Voorhies | 55—74 X |
| 2,899,474 | 8/1959 | Ricards | 55—76 X |
| 3,176,445 | 4/1965 | Collins et al. | 55—62 X |
| 3,183,646 | 5/1965 | Nishioka et al. | 55—76 X |

SAMIH N. ZAHARNA, *Primary Examiner.*

REUBEN FRIEDMAN, *Examiner.*

J. ADEE, *Assistant Examiner.*